United States Patent [19]

Seki

[11] Patent Number: 5,684,361

[45] Date of Patent: Nov. 4, 1997

[54] PLASMA DISCHARGE CHAMBER ARRANGEMENT FOR PLASMA-ADDRESSED DISPLAY DEVICE

[75] Inventor: Atsushi Seki, Kanagawa, Japan

[73] Assignee: Sony Corporation, Tokyo, Japan

[21] Appl. No.: 504,415

[22] Filed: Jul. 20, 1995

[30] Foreign Application Priority Data

Jul. 21, 1994 [JP] Japan .................... 6-169782
Sep. 9, 1994 [JP] Japan .................... 6-241912

[51] Int. Cl.⁶ .................................. H01J 17/58
[52] U.S. Cl. ............. 313/582; 313/583; 313/584; 313/586
[58] Field of Search ............... 313/582, 583, 313/584, 586

[56] References Cited

U.S. PATENT DOCUMENTS

| | | | |
|---|---|---|---|
| 5,116,704 | 5/1992 | Kwon. | |
| 5,349,455 | 9/1994 | Hayashi et al. | 313/582 |
| 5,351,144 | 9/1994 | Tanamachi | 513/484 |
| 5,495,142 | 2/1996 | Hayashi | 313/584 |
| 5,525,862 | 6/1996 | Miyazaki | 313/582 |

FOREIGN PATENT DOCUMENTS

| | | |
|---|---|---|
| 0 500 085 | 8/1992 | European Pat. Off. . |
| 42 23 303 | 4/1993 | Germany . |
| 42 11 258 | 5/1993 | Germany . |

OTHER PUBLICATIONS

Japanese Abstract, 60–230336, Nov. 15, 1985, vol. 10, No. 87 (E–393).

Japanese Abstract, 58–54534, Mar. 31, 1983, vol. 7, No. 140 (E–182).

*Primary Examiner*—Sandra L. O'Shea
*Assistant Examiner*—Vip Patel
*Attorney, Agent, or Firm*—Hill, Steadman & Simpson

[57] ABSTRACT

A plasma-addressed display device comprises a first substrate having a number of first electrodes arranged alternately in parallel on a main surface, a second substrate having a number of second electrodes orthogonal with respect to the first electrodes and arranged alternately in parallel, with the second electrodes facing the first electrodes, a dielectric sheet interposed between the first and second substrates, an electro-optical substance for maintaining a space between the dielectric sheet and the first substrate and a underlying layer formed between the second substrate and the second electrodes, so that warping of the glass substrate of the plasma cell side may be suppressed and substrate discharge within the plasma cell may be controlled.

9 Claims, 5 Drawing Sheets

PLASMA DISCHARGE CHAMBER ARRANGEMENT FOR PLASMA-ADDRESSED DISPLAY DEVICE

BACKGROUND OF THE INVENTION

1. Field of the invention

The present invention relates to a plasma address display device having a flat-panel structure with display cells and plasma cells being overlaid.

2. Description of Related Art

Plasma-addressed display devices utilizing plasma cells for addressing display cells such as, for example, that put forward in Japanese Patent Laid-Open Publication No. Hei.4-265931 (issue date: Sep. 22, 1992) have been proposed. As shown in FIG. 5, the plasma-addressed display devices have a flat panel structure comprising display cells 501 and plasma cells 502 interposed by a thin glass sheet 503 made of a dielectric sheet. The plasma cells 502 are constructed from a lower substrate 504 bonded to the thin glass sheet 503, with ionizable gas being injected into the space between both items. High productivity and operability together with minimum size of discharge electrodes are possible because discharge electrodes 505 may be printed and baked on the flat substrate 509 using screen printing techniques etc. Barrier ribs 506 are then formed on the discharge electrodes 505 and discharge channels are constructed by dividing up the space injected with the ionizable gas. These barrier ribs 506 may also be printed and baked using screen printing techniques and their ends come into contact with the lower surface of the thin glass sheet 503. The stripe-shaped discharge electrodes 505 function alternately as anodes and cathodes with a plasma discharge being generated between the two. The thin glass sheet 503 and the lower substrate 504 are bonded together using a glass frit 507 etc.

On the other hand, the display cells 501 are constructed using a transparent upper substrate 508. This upper substrate 508 is pasted to the thin glass sheet 503 via a prescribed gap using a sealant 509 etc. This gap is then filled with an electro-optical material such as liquid crystal 510, with display electrodes 511 being formed at the inner surface of the upper substrate 508. These display electrodes 511 are orthogonal with respect to the stripe-shaped discharge electrodes 505. A matrix of pixels is defined by the intersecting portions of the display electrodes 511 and the discharge channels.

The plasma-addressed display devices having this structure are scanned so as to change over in a row scan operation of discharge channels which perform plasma discharges. An image signal is then applied to the display electrodes 511 arranged in column direction on the side of the display cells 501 in synchronization with this scanning and the display is driven. When a plasma discharge occurs within a discharge channel, anode potential is attained in an approximately uniform manner and pixel selection is performed for each line of pixels. i.e. the discharge channels function as sampling switches. When the plasma sampling switches are conducting and image signals are applied for each pixel, the lighting or extinguishing of pixels for which a sample/hold operation is carried out is controlled. The image signal is then maintained within the pixels as is after the plasma sampling switch goes into a non-conducting state.

Next, the problems the present invention sets out to resolve are described with reference to FIG. 6. When the plasma cell 502 is made, a process is adopted where a conductive paste taking, for example, $Ni_2B$ as it's main component is used as the material for the discharge electrodes 505 and an insulating paste such as a glass paste is used as the material for the barrier ribs 506. These are then printed on the lower substrate 504 comprised of glass etc. and baked. The barrier ribs 506 are then printed directly after drying is carried out at a comparatively low temperature after the discharge electrodes 505 are printed. After this, the discharge electrodes and the barrier ribs are baked at the same time at a high temperature. However, if the discharge electrodes are baked at a high temperature, bending occurs in the lower substrate 504 due to contracting because of the sintering of the conductive paste and mismatching of the thermal expansion coefficients. If this bending is severe, the seals for the display cells 501 peel at the time of assembly with the panel. More specifically, if the conductive paste which makes up the discharge electrodes is baked at a high temperature, the lower substrate transforms in the same way as bimetal because of contraction in the discharge electrodes 505 caused by sintering. Further, when cooling is carried out after high temperature baking, warping due to the thermal contraction coefficient of the discharge electrodes 505 being larger than the contraction coefficient of the lower substrate 504 comprised of glass etc. becomes a factor. For example, comparing expansion coefficients, at a temperature of 293K (20° C.) the thermal coefficient of the glass comprising the substrate is $2.8 \times 10^6$ to $10 \times 10^6$, whereas that of nickel, which is the main component of the discharge electrode, is $13.4 \times 10^6$. In the case of assembly of the plasma-addressed assembly device, the thin glass sheet 503 is bonded to the bent lower substrate 504 using a glass frit, with the warped shape of the lower substrate 504 being maintained even after bonding. When the liquid crystal cells 501 are pasted to the upper substrate 508 using sealant 509 etc. for assembly, the warping of the lower substrate 504 is temporarily corrected using pressure (see FIG. 5). However, peeling-off occurs due to stress incurred at the adhered portions of the sealant 509 because the lower substrate 504 returns to a warped state when the pressure is removed. In the worst case, the thin glass sheet 503 will fracture due to the difference in the stress between the upper substrate 508 and the lower substrate 504.

Each of the discharge electrodes 505 are spaced equally on the lower substrate 504, with barrier ribs 506 being printed on the discharge electrodes 505, as shown in FIG. 7. A discharge region H2 is partitioned by this plurality of barrier ribs 506 so as to be divided up into independent plasma chambers $P_1, P_2, \ldots$ with ionizable gas being introduced at each of these plasma chambers P1, P2, ... Any one or a mixture of the gases helium, neon and argon may be used as this ionizable gas.

A barrier rib 506 is formed at each band-shaped electrode of the plurality of discharge electrodes for each scanning unit so that each plasma chamber $P_1, P_2, \ldots$ corresponds to each scanning line. The barrier ribs 506 are formed by printing a plurality of laminated circuits using screen printing techniques employing a glass paste mixed with a ceramic such as alumina. The barrier ribs 506 serve to control the gap for the discharge region 512 i.e. the distance between the lower substrate 504 and the thin glass sheet 503. The gap for this discharge region 512 may be controlled by adjusting the number of times the screen printing is carried out while forming the barrier ribs 506 or the amount of glass paste etc. used during each print, and is usually about 200 μm.

The plurality of discharge electrodes 505 may be formed by printing an electrode paste including silver powder a plurality of times directly onto the lower substrate 504.

Alternatively, an etching process may be used. More specifically, the discharge electrodes 505 may be successively printed as discharge electrodes $505_1$, $505_2$ and $505_3$, as shown, for example in FIG. 8. At this time, the discharge electrode of the lowest layer $505_1$ is formed so as to be wider than the layer discharge electrodes $505_2$ and $505_3$. This is because sagging in the electrode paste for the discharge electrodes $505_1$ printed directly onto the lower substrate 504 is greater than sagging in the materials for the electrode paste for the discharge electrodes $505_2$ and $505_3$ printed on the electrode paste.

A plurality of display electrodes 111 which make up the upper substrate 108 are formed using optically transparent, conductive material such as, for example, Indium Tin Oxide (ITO). The display electrodes 111 are arranged in parallel with respect to each other so as to be, for example, vertical with respect to a screen.

At the plasma cell, the side walls of the cathodes and the side walls of the anodes are arranged so as to face each other through plasma chambers P, with this being referred to as a wall electrode structure or a side electrode structure. In this side electrode structure, the plasma discharge path goes straight from the wall of one discharge electrode 505 to the wall of another discharge electrode 505, as shown by the arrow R. However, if the discharge electrodes 505 are comparatively thin, unfavorable discharge occurs due to electric field convergence going to the end of the discharge electrodes because the surface area of the discharge electrodes 505 which contribute to the side discharge is small, and an irregular discharge takes place. This problem may be resolved by making the height of the discharge electrodes 105 100 µm or more.

However, generally, the thermal expansion coefficient of the material for the discharge electrodes 505 and the thermal expansion coefficient of the lower substrate 504 do not coincide. Therefore, when the discharge electrode 105 is thick, the lower substrate 504 warps due to the thermal expansion coefficient of the discharge electrodes 505 and the thermal expansion coefficient of the lower substrate 504 not coinciding. This may cause the lower substrate 504 to crack and the seal for the liquid crystal cell 501 to peel.

In this case, when a glass substrate of a usual thickness of, for example, about 1 to 2 µm is used, this problem may be resolved by preventing a magnitude of stress from occurring in the glass substrate to an extent that warping does not occur by making the thickness of the discharge electrodes 105 less than 100 µm.

However, as described above, if the thickness of the discharge electrodes is made to be less than 100 µm, the surface area of the discharge electrodes 505 which contribute to side discharge becomes small and the aforementioned abnormal discharge occurs.

This is to say that, as shown in FIG. 8, electric field convergence occurs at the portions of the lowermost layer $505_1$ of the laminated, printed discharge electrodes 505 which are wider than the upper discharge electrode $505_2$ and unfavorable localized discharge occurs.

SUMMARY OF THE INVENTION

It is therefore an object of the present invention to provide a plasma-addressed display device in which warping of the glass substrate of the plasma cell side may be suppressed.

It is a further object of the present invention to provide a plasma-addressed display device in which substrate discharge within the plasma cell is controlled.

In one aspect of the present invention, there is provided a plasma-addressed display device comprising a first substrate having a number of first electrodes arranged alternately in parallel on a main surface, a second substrate having a number of second electrodes orthogonal with respect to the first electrodes and arranged alternately in parallel, with the second electrodes facing the first electrodes, a dielectric sheet interposed between the first and second substrates, an electro-optical material disposed in a space between the dielectric sheet and the first substrate and an underlying layer formed between the second substrate and the second electrodes.

The second electrodes may be comprised by the sintered body of a conductive paste and the device may further include barrier ribs composed of sintered glass paste formed on the second electrodes.

Further, the underlying layer may be composed of sintered glass paste having a higher softening point than a softening point of the glass paste forming the barrier ribs.

Moreover, the underlying layer may be formed from sintered paste having a viscosity higher than the viscosity of the conductive paste forming the second electrodes.

The relationship between the viscosity ρ1 of the conductive paste comprising the second electrodes and the viscosity ρ2 of the conductive paste comprising the underlying layer may be given by:

$$\rho 2 = 1.1 \rho 1 = 2.0 \rho 1$$

Still further, a barrier rib may be formed at each of the second electrodes, the barrier ribs may be formed periodically on the number of second electrodes, and the second electrodes may be 40 to 100 µm thick.

In another aspect of the present invention, a plasma-addressed display device manufacturing method for a plasma-addressed display device having a flat panel structure with a display cell and a plasma cell being overlaid, comprises the steps of:

printing a first glass paste, conductive paste and second glass paste successively onto a substrate;

sintering the conductive paste, the first glass paste and the second glass paste so as to form discharge electrodes, underlying layers and barrier ribs, respectively;

bonding the ends of the barrier ribs to a dielectric sheet so as to form plasma cells; and injecting an electro-optical substance into a space so as to form display cells after a further substrate formed with display electrodes is bonded to the dielectric sheet via a prescribed space.

Here, the softening point of the first glass paste is higher than that of the second glass paste.

Further, the viscosity of the first glass paste may be higher than that of the conductive paste.

The relationship between the viscosity ρ1 of the conductive paste and the viscosity ρ2 of the first glass paste may be given by:

$$\rho 2 = 1.1 \rho 1 - 2.0 \rho 1$$

Moreover, a barrier rib may be formed at each of the second electrodes, and the barrier ribs may be formed periodically on the discharge electrodes arranged in columns.

BRIEF DESCRIPTION OF THE DRAWINGS

FIG. 5 is a schematic cross-sectional view showing an example of a plasma-addressed display device;

FIG. 6 is a schematic view for describing problems to be resolved;

DETAILED DESCRIPTION OF THE PREFERRED EMBODIMENTS

First Embodiment

Figure 1:
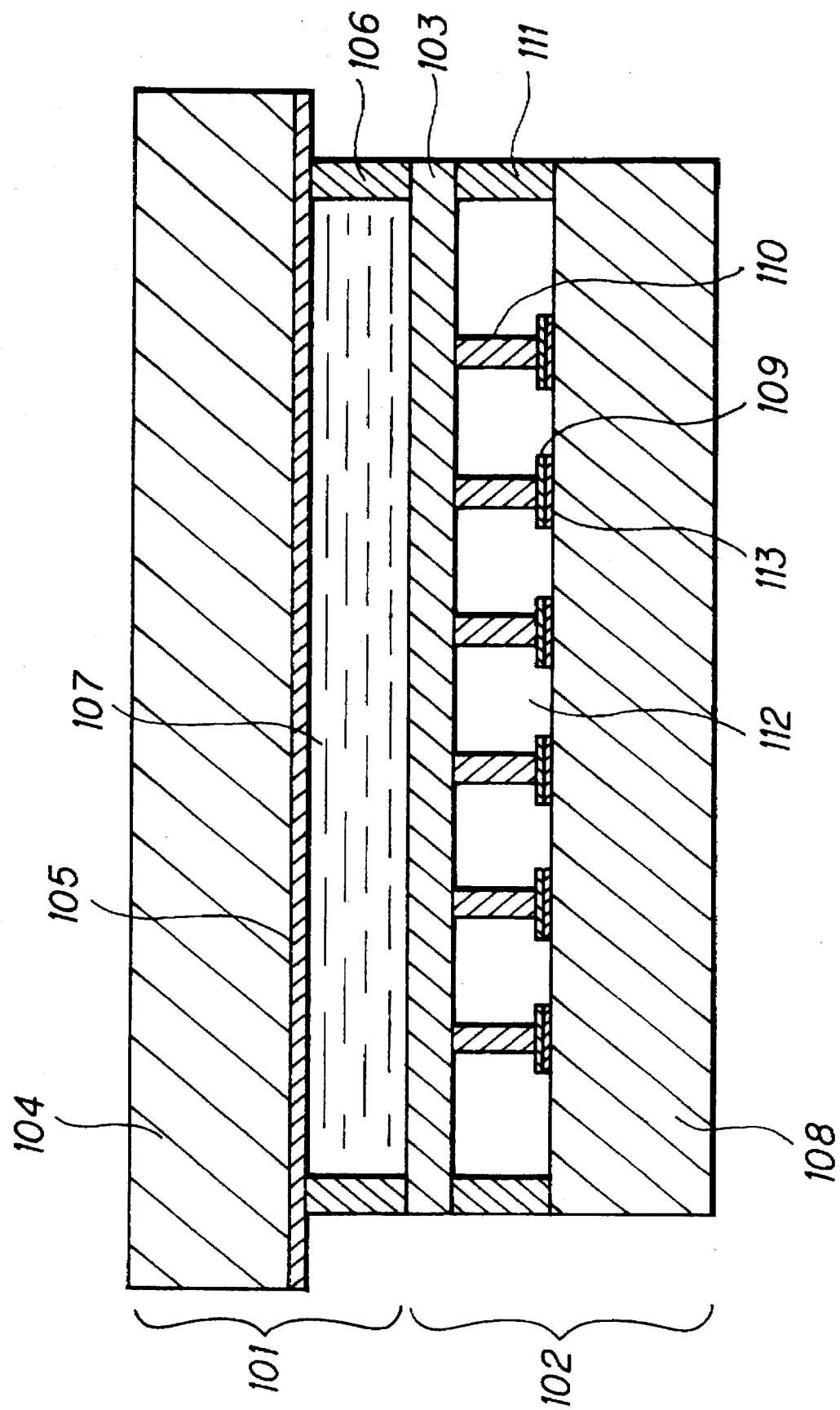
FIG. 1 is a schematic cross-sectional view showing the structure of a plasma-addressed display device of the present invention.

The following is a detailed description with reference to the drawings of the preferred embodiments of the present invention. FIG. 1 is a schematic cross-sectional view showing the structure of the plasma-addressed display device of the present invention. As shown in the drawing, this plasma-addressed display device comprises a laminated flat panel structure with a thin glass sheet 103 being sandwiched between a display cell 101 and a plasma cell 102. The display cell 101 is constructed using an upper substrate 104 comprised of, for example, glass. A plurality of display electrodes 105 comprised of a transparent conductive film are formed parallel to the main part of the inner surface of the upper substrate 104 in the column direction. The upper substrate 104 is then adhered to the thin glass sheet 103 via a prescribed spacing using a sealant 106. An electro-optical material comprising liquid crystal 107 etc. is then vacuum sealed within the gap.

On the other hand, the plasma cell 102 is constructed using a lower substrate 108 comprising glass etc. Discharge electrodes 109 are formed on the main part of the inner surface of the lower substrate 108 so as to extend in the row direction orthogonally with respect to the display electrode 5. These discharge electrodes 109 alternate between being anodes and a cathodes and generate a plasma discharge. Barrier ribs 110 are formed along and overlap with parts of the discharge electrodes 109. The ends of the barrier ribs 110 come into contact with the thin glass sheet 103 and act as a spacer. The lower substrate 108 is joined with the thin glass sheet 103 using glass frits 111, with an air-sealed space in between. This space is partitioned by the barrier ribs 110 so as to construct individual discharge channels 112. An ionizable gas is introduced into the airtight space. This gas may be, for example, any one of a mixture of helium, neon or argon.

The barrier ribs 110 may be provided only on the anodes or alternatively, the same electrodes may function as both anodes and cathodes depending on the driving method with the discharge electrodes all being formed at an equal distance apart.

A characteristic of this embodiment is that underlying films 113 are interposed as a buffer layers for the discharge electrodes 109 and absorb the stress between the discharge electrodes 109 and the lower substrate 108. In this way, it is possible to suppress warping in the lower substrate. These foundation films 113 comprise printed and sintered first glass paste sintered Compacts. On the other hand, the barrier rib 110 formed on the discharge electrode 109 comprises a second glass paste sintered body, printed and sintered in the same way. The softening point of the first glass paste is set-up to be higher than the softening point of the second glass paste.

The manufacturing method for this plasma-addressed display device will now be described with reference to FIG. 1. First, the printing process is carried out, and the first glass paste, the conductive paste and the second glass paste are printed one after the other on the lower substrate 108. The first glass paste and the second glass paste are comprised of a mixture of grains of glass, a resin binder, a solvent and other additives. The first glass paste has a relatively high softening point of about 520° to 560° C. On the other hand, the second glass paste has a relatively low softening point of about 430° to 530° C. Next, the heating process is carried out, with the lower substrate 108 being heated to a temperature of, for example, 540° to 580° C. and the conductive paste being sintered and taken as the discharge electrodes 109. At the same time, the second glass paste is sintered to become the barrier ribs 110 simultaneously with the first glass paste being sintered to become the underlying film 113. It is preferable for the first glass paste to have a softening point in the range of 520° to 560° C. so that the heating process may be carried out in the general range of 540° to 580° C. If the temperature is below 520° C., pressure absorption effects allowing the sintering of the foundation film 113 to progress sufficiently will not be exhibited. Alternatively, if the temperature is above 560° C., the extent of the sintering will be too small and the adhesiveness of the foundation film 113 and the lower substrate 108 will be insufficient. More specifically, the aforementioned printing processes and heating processes involve a plurality of heating process stages. i.e. after printing, drying is carried out at 150° C. and a solvent including the paste is evaporated. Next, heating is carried out to about 400° C. in air and the solvent including the paste is baked off. In the final stage, heating is carried out to a temperature of, for example, 580° C. and the paste including glass particles and metal particles is sintered.

Next, a first bonding process is carried out, with the tip of the barrier rib 110 coming into contact with the thin glass sheet 103 and then being bonded so as to provide the plasma cell 102. Finally, in a second bonding process, after the upper substrate 104 on which the display electrodes 105 are already formed in rows is bonded to the thin glass sheet 103 with a prescribed space in-between, liquid crystal 107 is injected into the space, the display cell 101 is provided and the plasma-addressed display device is complete.

Figure 2:
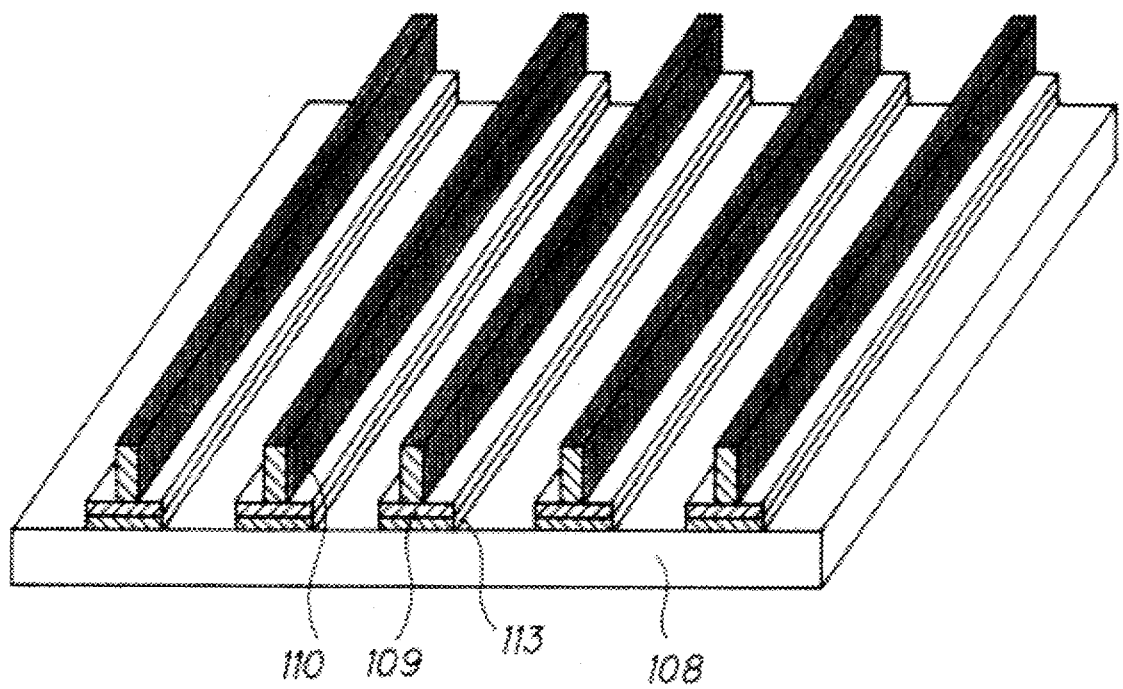
FIG. 2 is a perspective view showing the striped pattern of the lower substrate comprising the plasma cell.

FIG. 2 is a perspective view showing the shape of the surface pattern of the lower substrate 108 shown in FIG. 1. Underlying films 113 are formed in stripes on the surface of the lower substrate 108 comprised of glass etc. The underlying film 113, however, is by no means limited to a striped shape, and may also be formed over the entire surface of the lower substrate 108. However, when the underlying film is formed all over, the surface of the underlying film 113 is uneven and there is the fear that the polarization surface may become disheveled and the display contrast may be lowered when light incident to the display device is linearly polarized. Therefore, with display cells employing liquid crystal as the electro-optical substance, it is preferable for the underlying film 113 to be matched with the discharge electrodes 109 or for the barrier rib 110 to be of a striped shape so that general linear polarization may be used for the incident light. i.e. it is preferable if the underlying film 113 is removed from regions which incident light passes through, beforehand. The discharge electrodes 109 overlaid on the underlying film 113 are formed in stripes. These discharge electrodes 113 are arrayed at a prescribed pitch, with each individual stripe having a width of prescribed dimensions. These discharge electrodes 109 are made by screen-printing and then baking a conductive paste consisting of, for example, $Ni_2B$ taken as the main component, a binder, and a solvent which are mixed together. The barrier ribs 110 are formed on the discharge electrodes 109. These barrier ribs 110 are also striped with the same pitch. The stripes of the barrier rib 110 are slightly narrower than the stripes of the discharge electrodes 109 and are matched with respect to these discharge electrodes 109. The barrier rib 110 is made by screen printing an insulation paste made of, for example, glass paste etc. and then performing high temperature baking.

In this embodiment, an underlying film 113 comprising of glass paste is provided as the underlayer for the discharge electrodes and bending in the lower substrate may be reduced by making the softening point of this underlying film 113 higher than the softening point for the glass paste of the barrier rib. Bending in the lower substrate occurs due to stress applied in such a manner as to cause the discharge electrodes to contract in the direction of the stripes. It is the function of the underlying films 113 to absorb this stress and this will be described in detail in the following. Basically, the glass paste of the printed foundation is made of a sintered glass layer via the following process. First, the solvent is evaporated at a low temperature of about 150° C. Then, the resin binder (non-volatile) is baked-off by heating the substrate to 350° to 400° C. in the presence of oxygen. The glass particles are then fused together by heating the substrate to a temperature of about 540° to 600° C. This process is known as sintering. A glass layer having superior continuity is formed a glass paste having a low softening point which is easy to sinter. On the other hand, a porous glass layer is formed from a glass paste having a high softening point so as to include minute spaces which make sintering difficult. If the difficult-to-sinter glass paste is used as an underlayer for the discharge electrodes, minute cracks occur within the underlying film when the discharge electrodes contract in the stripe direction because the underlayer is porous. i.e. the contractive stress of the discharge electrodes is relieved by the generation of cracks in the underlying film 113, with it being difficult to transmit this to the lower substrate 8, and the occurrence of bending is therefore suppressed. The baking temperature is generally decided using the sintering temperature for the glass paste which forms the barrier ribs. If, however, the softening point of the glass paste for the underlayer is lower than the softening point of the glass paste for the barrier ribs, the sintering of the underlayer progresses hastily and the function as the buffer layer is not seen to be effective against the contractive stress. It may therefore be set up the softening point of the glass paste for the underlying film to be higher than the softening point of the glass paste for the barrier rib and the buffer film can therefore be seen to function as such by using this kind of material.

As described above, a plasma-addressed display device of a flat panel structure with a display cell and a plasma cell being overlaid has an underlying film comprising a glass paste etc. of a comparatively high fusing point provided under the discharge electrodes forming the plasma cell, with stress occurring between the discharge electrodes and the lower substrate then being absorbed. In this way, bending in the lower substrate can be reduced and, when the display cells are laminated with respect to the plasma cells, and there is no fear of the seal peeling.

Second Embodiment

Figure 3:
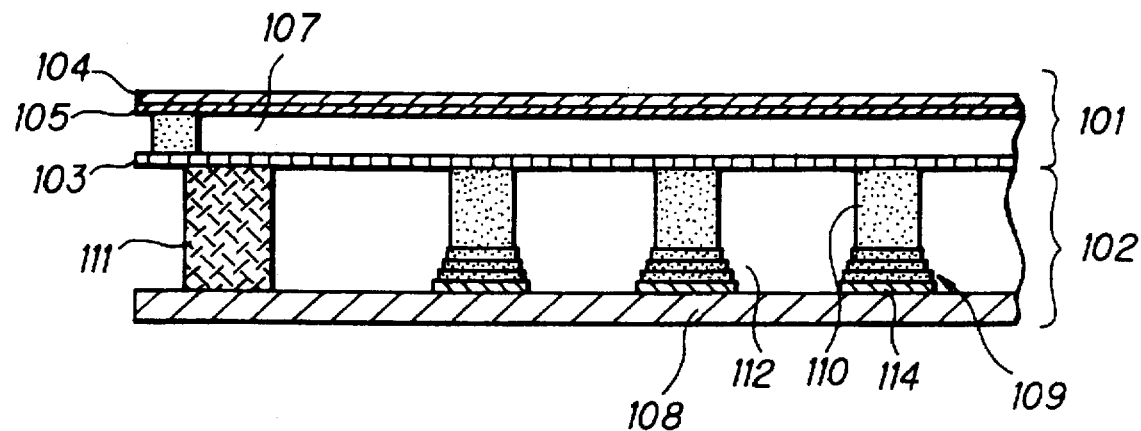
FIG. 3 is a schematic cross-sectional view showing a plasma-addressed display device of a further embodiment of the present invention.

In the same way as for the first embodiment, as shown in FIG. 3, a device according to this second embodiment comprises a liquid crystal cell 101 and a plasma cell 102 interspersed by a thin glass sheet 103. First, a plurality of underlying layers 114 are formed at equal intervals on a glass substrate 108, with a plurality of discharge electrodes 109 then being formed on these underlying layers 114. Barrier ribs 110 are then printed on these discharge electrodes 109, with frits 111 being daubed around the barrier ribs 110. The upper end of the barrier ribs 110 are then opposed by a thin glass sheet 103, so that a plurality of discharge regions 112 are formed. A liquid crystal layer 107 is then provided between the thin glass sheet 103 and the plurality of display electrodes 105 formed on the thin glass sheet 103 so as to be orthogonal with respect to the plurality of discharge electrodes 109. In this embodiment also, the barrier ribs are provided on all of the discharge electrodes but it is also possible to provide the barrier ribs periodically only on the anodes, etc.

Figure 4:
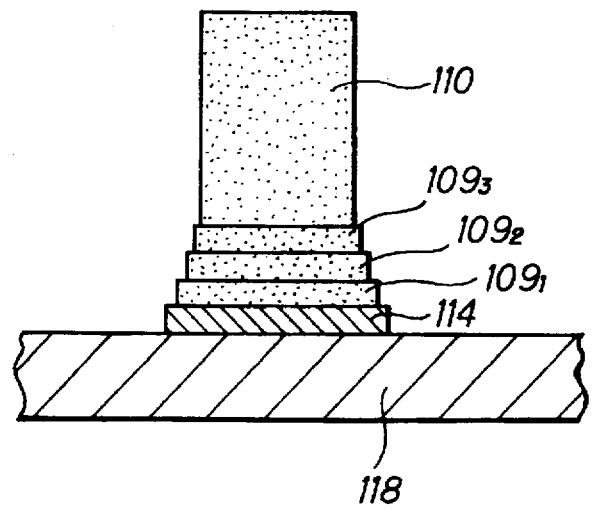
FIG. 4 is a detailed cross-sectional view showing the structure of the discharge electrodes.
Figure 3:
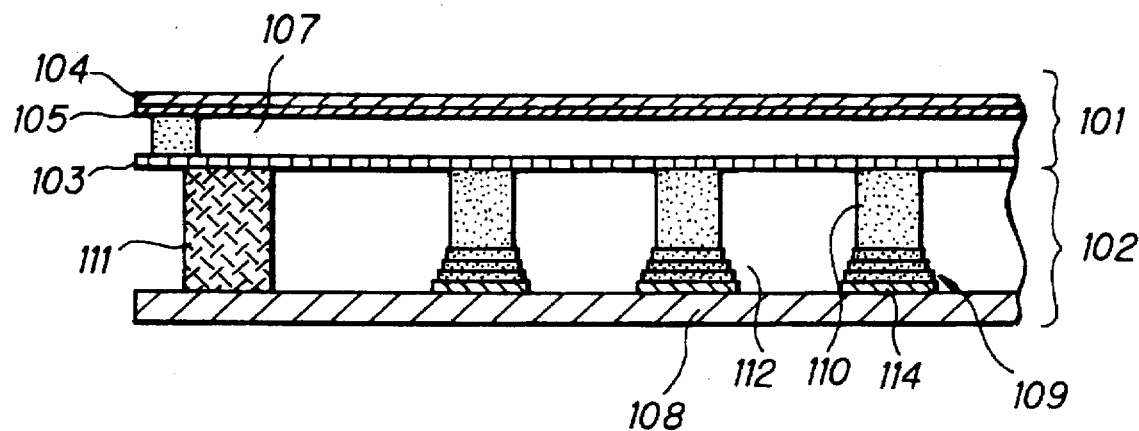
Figure 4:
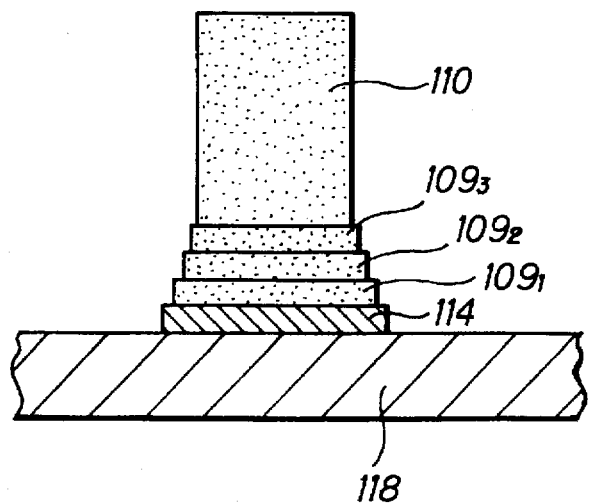
Figure 7:
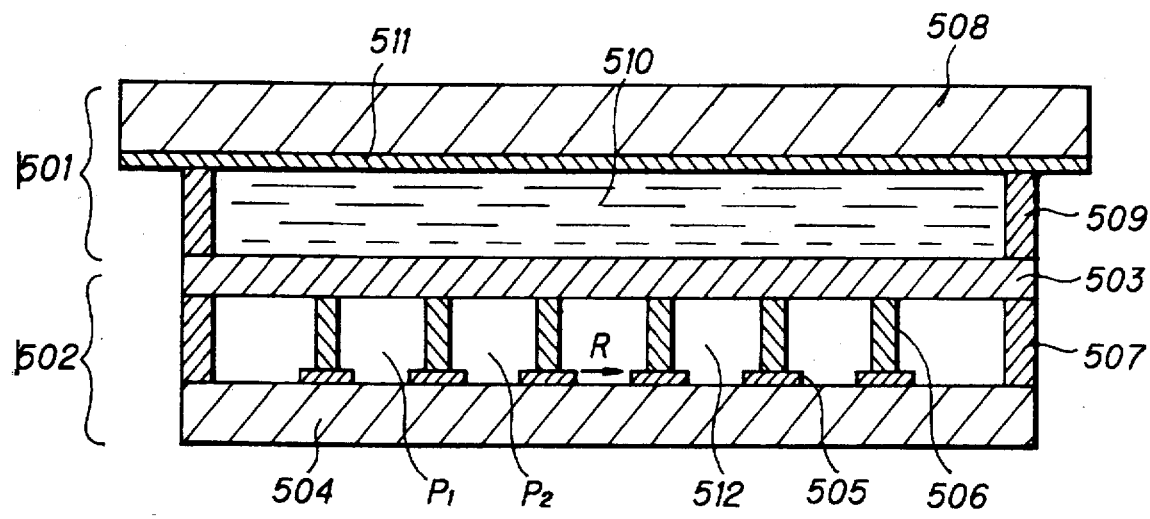
FIG. 7 is a schematic cross-sectional view showing an example of a plasma-addressed display device.
Figure 8:
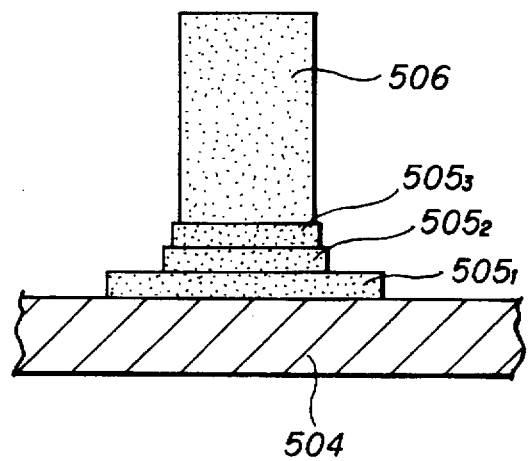
FIG. 8 is a cross-sectional view showing the detailed structure of the discharge electrodes.

The specific structure of the discharge cells 109 within the plasma cells 102 is shown in FIG. 4. Here, a single layer underlying layer 114 is printed on a glass substrate 118. The paste material of this underlying layer 114 has a viscosity which is larger than the viscosity of the electrode paste material for the discharge electrodes 9, i.e. the sagging is less. Next, a plurality of layers of discharge electrodes 109 are printed on this underlying layer 114. In FIG. 4, the case is shown where three layers of discharge electrodes 1091, 1092 and 1093 are printed. At this time, the width of the underlying layers 114 formed directly on the glass substrate 118 and the width of the plurality of discharge electrodes 109 formed as layers on this underlying layer 114 are approximately equal because sagging of the electrode paste material of the discharge electrodes 109 formed on the underlying layer 114 is suppressed due to the underlying layer 114 using a paste material having a high viscosity.

In this way, the electric field convergence which occurred across a broader portion of the discharge electrodes of the upper layers of the first layer discharge electrode does not occur and unfavorable localized discharges are no longer generated. This also means that a stable side discharge is possible even if the discharge electrode 10 is less than 100 μm thick.

However, a discharge electrode thickness of 40 to 100 μm is preferred because the discharge flickers if the surface area of the discharge electrode 109 contributing to the side discharge is too small.

Further, if the viscosity of the paste material of the underlying layer 114 is taken to be ρ2 and the viscosity of the electrode paste material for the discharge electrode 109 is taken to be ρ1, the viscosity ρ2 is set up to be a value falling within the scope shown by the following equation (1).

$$\rho 2 = 1.1 \rho 1 \text{ to } 2.0 \rho 1 \quad (1)$$

In the case of the value of the viscosity of the paste material for the underlying layer 114 being smaller than the scope shown in equation (1), when the underlying layer 114 is formed, the width of the underlying layer 114 becomes greater than the width of the discharge electrode 109 formed at the upper layer and the sagging of the electrode paste material is no longer suppressed.

A material capable of suppressing sagging in the discharge electrodes 109 may be used as the paste material for the underlying layer 119.

Next, an example of the process for forming the underlying layer 119, the discharge electrodes 109 and the barrier ribs 110 on the glass substrate 118 is described in detail. A screen of mesh number 325, linear diameter 23 μm, bias angle 32 degrees and of a porosity rate of 50% having a stripe pattern of width 70 μm and a pitch of 410 μm is used for the printing in these forming processes.

First, the underlying layer 114 is printed on the glass substrate 118 to a thickness of 20 μm using a ELD-511glass paste (manufactured by OKUNO SEIYAKU) as the paste material for this underlying layer 114, with drying then being carried out at 150° C.

Next, the discharge electrodes 109 are laminatedly printed to a thickness of 50 mm on the printed underlying layer 119 using 9535M nickel paste (manufactured by Dupont) as the electrode paste material for the discharge electrodes 109. Drying is carried out at 150° C. at this time for each layer printed.

Further, barrier ribs are laminatedly printed to a thickness of 200 μm on the discharge electrodes 109 using ELD-511 glass paste (manufactured by OKUNO SEIYAKU). Drying is carried out at 150° C. at this time for each layer printed.

After this, the glass substrate 111 with the underlying layer 114, the discharge electrodes 109 and the barrier ribs 115 is baked under atmospheric conditions to a temperature of 490° C. Further, the air is replaced with nitrogen, the temperature is increased, and baking is carried out in a nitrogen atmosphere at a temperature of 580° C.

The baked glass substrate 118 is immersed in ethylene glycol for 5 minutes in order to activate the discharge electrodes 109 and then soaked for three minutes in hydrogen peroxide (manufactured by KANTO KAGAKU) of 30 to 35% concentration. After the immersed glass substrate has been washed and dried, the thin glass sheet 103 and the liquid crystal cell 101 are attached and the plasma address liquid crystal display device is made.

Peeling in the seal of the liquid crystal cell 101 and cracks in the thin glass sheet 103 due to bending in the glass substrate 118 do not occur when the plasma-addressed display device is made in this way. Also, stability and uniformity in the discharging of the plasma address liquid crystal display device is good and the discharge starting voltage is 210 V.

Further, in the above forming processes, if the plasma address liquid crystal display device is made with the thickness of the discharge electrodes 109 being taken to be 70 μm or 90 μm while all the other conditions remain the same, peeling of the seals for the liquid crystal cells 101 and cracks in the thin glass sheet 103 due to bending of the glass substrate will not occur in the same way as for the case where the thickness of the discharge electrode 109 is taken to be 50 mm. Moreover, the stability and uniformity of the discharge for this plasma-addressed liquid crystal display device is good. From the above results, a thickness of the discharge electrode 109 of 40 to 100 μm is preferred.

In the aforementioned forming processes, if the plasma address liquid crystal display device is made with the thickness of the discharge electrode 109 being taken to be 35 mm with all other conditions remaining the same, it is not possible to perform a stable discharge. Further, if the thickness of the discharge electrode 109 is taken to be 150 mm, the seals of the liquid crystal cells 101 peel and cracks occur in the thin glass sheet 103. Moreover, if the plasma address liquid crystal display device is made without printing a underlying layer of glass paste while keeping all other conditions the same with the thickness of the discharge electrodes 109 being 100 μm, unfavorable localized discharge occurs due to electric field convergence going to the end of the electrodes when the voltage across the cathodes and the anodes is increased and a stable discharge cannot be achieved.

As becomes clear from the above description, the plasma address liquid crystal display device of these embodiments has a underlying layer interposing a thin glass sheet and discharge electrodes. Abnormal discharge due to electric field convergence is then suppressed at the discharge electrodes by making the viscosity of the paste material forming the underlying layer larger than the viscosity of the paste material forming the discharge electrodes. Also, backlight illumination can be made brighter because the surface area of openings in the glass substrate for backlight illumination may be made larger.

Further, the glass will not bend and cracks in the thin glass sheet and peeling of the seals for the liquid crystal cells is prevented by making the thickness of the discharge electrodes from 40 to 100 μm.

What is claimed is:

1. A plasma-addressed display device comprising:

a first substrate having a plurality of first electrodes arranged alternately in parallel on a main surface;

a second substrate having a plurality of second electrodes orthogonal with respect to the first electrodes and arranged alternately in parallel with the second electrodes facing the first electrodes;

a dielectric sheet interposed between the first and second substrates;

an electro-optical material disposed in a space between the dielectric sheet and the first substrate; and an underlying layer formed between the second substrate and the second electrodes, said underlying layer being of a material capable of absorbing thermal stress between said second substrate and said second electrode.

2. A plasma-addressed display device according to claim 1, wherein said second electrodes are of sintered conductive paste.

3. A plasma-addressed display device according to claim 2, further comprising barrier ribs composed of sintered glass paste formed on the second electrodes.

4. A plasma-addressed display device according to claim 3, wherein the underlying layer is composed of sintered glass paste having a higher softening point than that of the glass paste forming the barrier ribs.

5. A plasma-addressed display device according to claim 1, wherein the underlying layer is composed of sintered paste having a viscosity higher than that of the conductive paste forming the second electrodes.

6. A plasma-addressed display device according to claim 4, wherein a relationship between the viscosity ρ1 of the conductive paste comprising the second electrodes and the viscosity ρ2 of the conductive paste comprising the underlying layer is given by:

$$\rho 2 = 1.1 \rho 1 - 2.0 \rho 1.$$

7. A plasma-addressed display device according to claim 3, wherein a barrier rib is provided at each of the second electrodes.

8. A plasma-addressed display device according to claim 3, wherein the barrier ribs are provided periodically on the plurality of second electrodes.

9. A plasma-addressed display device according to claim 5, wherein the second electrodes are 40 to 100 μm thick.

* * * * *